May 17, 1938.   H. J. LOUNSBURY   2,117,338
QUICK TAKE-UP MECHANISM FOR HAND BRAKES
Filed Dec. 16, 1936    2 Sheets-Sheet 2
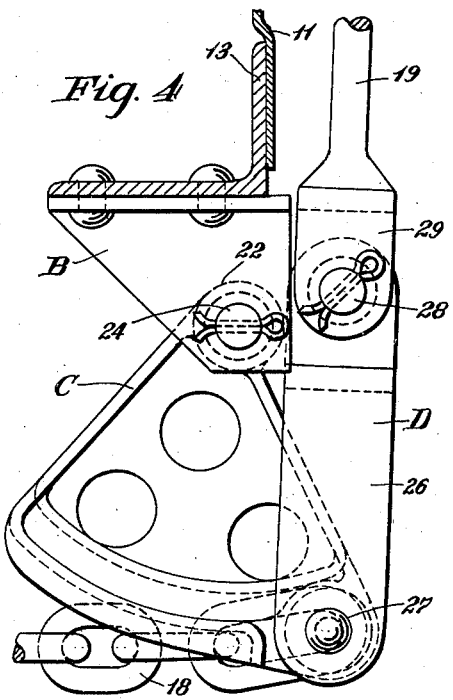
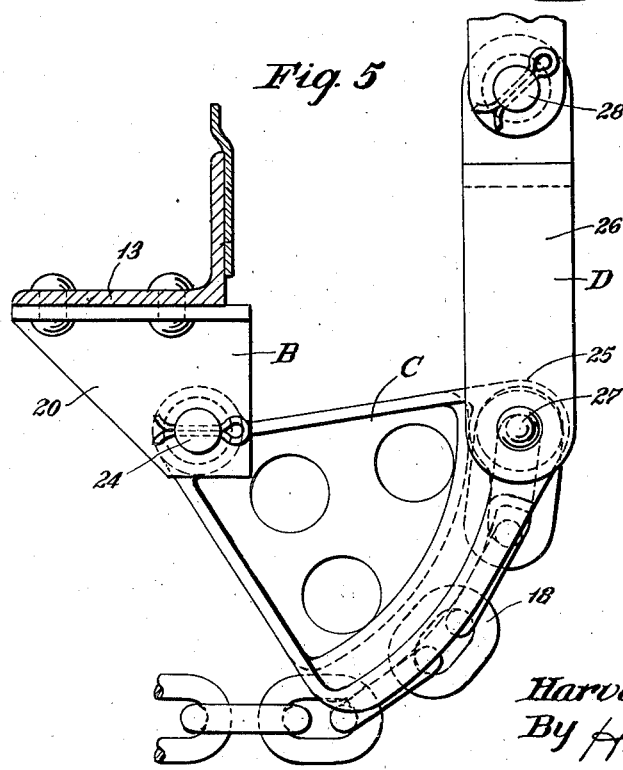
Inventor
Harvey J. Lounsbury
By Henry Fuchs
Atty.

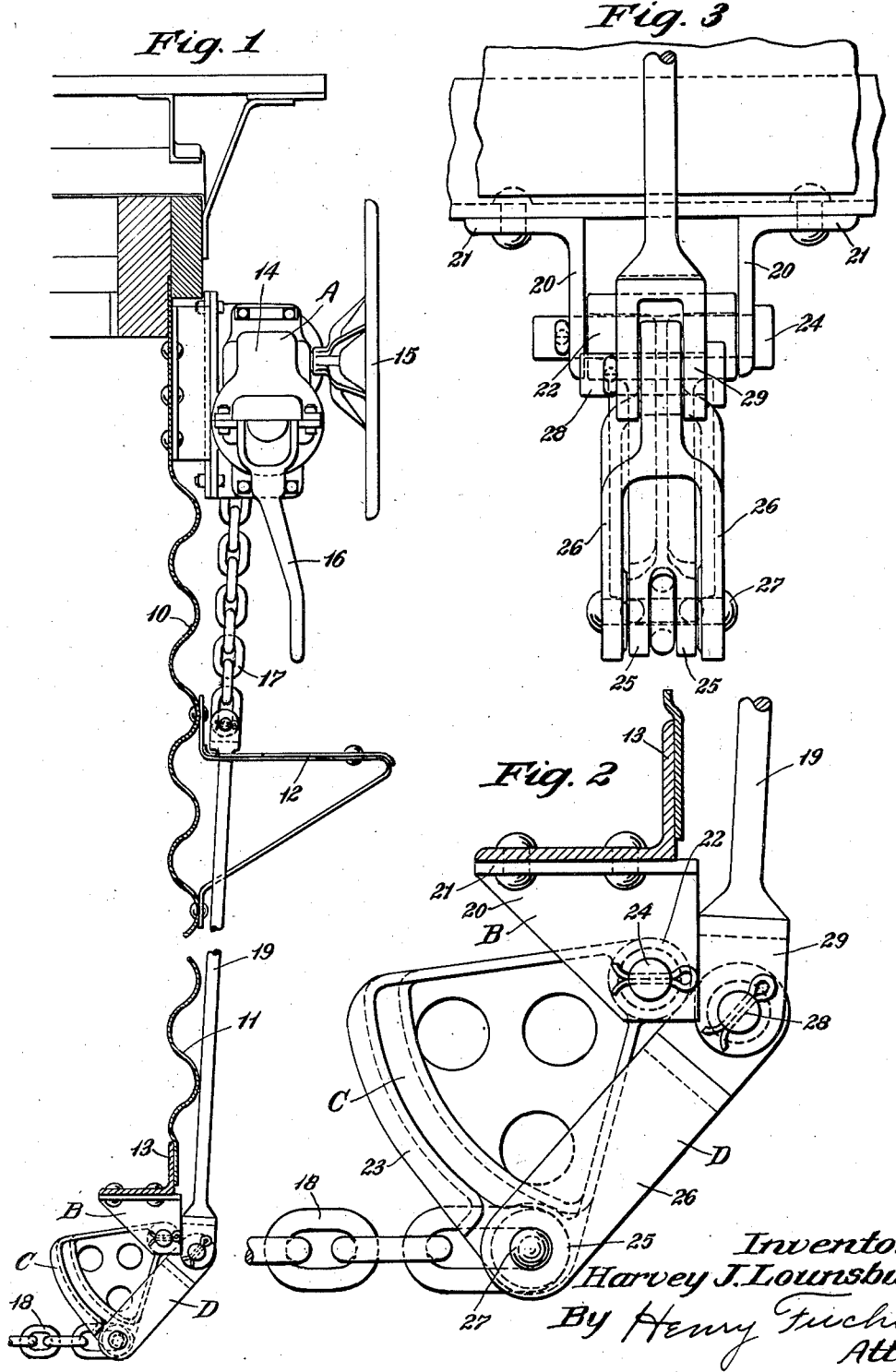

Patented May 17, 1938

2,117,338

UNITED STATES PATENT OFFICE 2,117,338

QUICK TAKE-UP MECHANISM FOR HAND BRAKES

Harvey J. Lounsbury, Glen Ellyn, Ill., assignor to W. H. Miner, Inc., Chicago, Ill., a corporation of Delaware Application December 16, 1936, Serial No. 116,133

6 Claims. (Cl. 74—517)

This invention relates to improvements in quick take-up mechanism for hand brakes.

One object of the invention is to provide a quick take-up mechanism for power multiplying hand brakes for cars, wherein the relatively slow movement transmitted by the power multiplying brake mechanism is augmented or increased during the initial application of the brakes by motion increasing lever means to quickly take up the slack in the brake mechanism, and wherein the lever means is rendered inactive to increase the motion during the final application of the brakes and the full effect of the power multiplication of the hand brake means thereof is transmitted to the brake mechanism proper of the car.

A further object of the invention is to provide in a brake mechanism including hand operated power multiplying means and means for transmitting the power thereof to the brake mechanism proper of the car, wherein the means for transmitting the power includes a chain or flexible connecting element leading to the brake mechanism proper of the car, a swinging or rocking member on which the chain is wound, and motion increasing lever means in the form of a connecting link in the power transmitting means active as a lever during the initial operation only of the power transmitting means by the power multiplying means to quickly take up the slack in the brake mechanism proper of the car, and functioning as a connecting link only during the remainder of the operation of applying the brakes to transmit power at a uniform rate and subject the brake mechanism proper of the car to the full effect of the power multiplication of the hand brake means, thereby setting the brakes with great force.

A more specific object of the invention is to provide a brake mechanism as set forth in the preceding paragraph wherein the parts are so arranged and designed that the rocking member is directly actuated by the link which has one end thereof pivotally connected to said member at a point remote from the pivotal axis of said member, and is swingable on a fulcrum support about said pivotal axis as a motion increasing lever through the pull exerted by the power multiplying means to rock said member with a rapid motion to quickly take up the slack, and that the link is pulled out of operative engagement with said fulcrum support by the action of the power multiplying means after said quick take-up action has been accomplished so that the same serves purely as a connecting link between the rocking member and the power multiplying means during the remainder of the application of the brakes to transmit the full power of the multiplying means to the brake mechanism proper of the car.

Other objects of the invention will more clearly appear from the description and claims hereinafter following.

In the drawings forming a part of this specification, Figure 1 is a vertical longitudinal sectional view through the end portion of a railway car illustrating my improvements in connection therewith, said view being partly broken. Figure 2 is an enlarged view of the structure shown at the lower portion of Figure 1. Figure 3 is an elevational view, looking from right to left in Figure 2. Figures 4 and 5 are views similar to Figure 2 but showing the parts of the mechanism in different positions.

In said drawings, 10 indicates the end portion of a railway car, having a vertical end wall 11 on which is mounted the usual platform 12 for the brakeman. The end sill of the car is indicated by 13.

My improved quick take-up means is herein illustrated in connection with a power multiplying hand brake mechanism A of well-known type, comprising a worm driven winding element for the brake chain as shown in Patents Nos. 1,974,581 and 1,854,804. The chain winding element and associated mechanism of the hand brake A are contained in a housing 14 secured to the end wall of the car and said mechanism is actuated by the usual hand wheel 15, as disclosed in the patents hereinbefore referred to. The worm operated actuating means is connected to the winding element by a lever operated clutch means. In the brake illustrated herein, the clutch operating lever is indicated by 16. The winding element of the power multiplying brake mechanism A has a chain section 17 connected thereto, said section being wound on said element when the hand wheel 15 is rotated in brake tightening direction and being unwound therefrom when the hand wheel is rotated in a reverse direction. Motion of the chain 17 is transmitted to the chain section 18 leading to the brake mechanism proper of the car through my improved take-up mechanism, which is actuated by a pull-up rod 19 connected to the lower end of the chain 17.

My improved quick take-up mechanism comprises broadly a combined supporting and guide bracket B; a swinging chain guide member C pivotally supported on said bracket; and a link D pivoted to the member C.

The combined supporting and guide bracket B comprises a pair of vertically disposed, laterally spaced plates 20—20 having outturned top flanges 21—21 secured to the underneath side of the end sill 13 of the car by rivets or similar securing elements.

The chain guide member C is in the form of a casting having a relatively wide hub portion 22, projecting from opposite sides thereof, and a curved chain guide portion 23 spaced from said hub portion. The member C is pivotally supported on the bracket B by a pivot pin 24 extending through the hub portion 22 and having its opposite ends seated in aligned pin receiving openings provided in the bottom end portions of the plates 20—20 of the bracket B. At the outer end of the chain guide portion 23, the member C presents spaced ears 25—25 adapted to accommodate the end link of the chain 18 therebetween.

The link D is in the form of a forked member having the arms 26—26 which are at the lower end thereof embracing the ears 25—25 of the member C. A pivot pin 27 in the form of a rivet extends through aligned openings in the ears 25—25 and the lower extremities of the arms 26—26 of the fork of the link D serves to pivotally connect the link D to the member C. The rivet or pin 27 also serves to anchor the chain 18 to the member C, said pin extending through the end link of the chain. The upper end of the link D is pivotally connected to the lower end of the pull-up rod 19 by a pivot pin 28, the lower end of the pull-up rod being forked, as indicated at 29, to receive the upper end of the link.

In Figures 1, 2, and 3, the parts of the mechanism are illustrated in the completely released position of the brakes with the chain 17 unwound from the winding drum of the power multiplying hand brake means A. In this position of the parts, the pull of the weight of the chain section 18 holds the upper portion of the link D in contact with the hub 22 of the member C, the hub 22 serving as a fulcrum support for the link D to provide for lever action during the initial pull-up movement of the rod 19 and the chain 17 during the first part of the application of the brakes. Inasmuch as the link D above the point of contact thereof, with the supporting fulcrum formed by the hub 22, provides a much shorter lever arm than the portion of the link extending below this point of contact, relatively slow upward pull on the link will cause swinging movement thereof about the axis of the pivot 24 of the member C, thereby effecting relatively rapid swinging movement of the lower end of the link and correspondingly rapid swinging movement of the member C.

In applying the brakes by actuation of the power multiplying brake means A, the chain 17 is forcibly pulled upwardly, thereby transmitting an upward pulling action on the link D through the connecting pull-up rod 19. During the initial pull-up action, the link D is rocked about the pivotal axis of the hub 22 as contact of the link with the hub prevents movement of the link toward said pivotal axis. This rocking action of the link D is transmitted to the member C, thereby effecting quick rotation of the latter on its pivot and winding of the chain 18 thereon to quickly take up the slack in the brake mechanism proper of the car, the chain 18 being wound on the curved guide of the member C.

The parts are thus moved from the position shown in Figure 2 to the position shown in Figure 4. When the parts reach the position shown in Figure 4, as will be evident upon comparison of these figures, the angular relation of the pull-up rod and the link D is straightened out when the member C reaches the position shown in Figure 4, and during further upward pull on the rod 19, the upper end of the link D is swung outwardly away from the hub 22 of the member C, whereupon the link no longer acts as a lever and functions purely as a connecting link to transmit the pull directly to the member C at the pivotal connection of the link therewith. Swinging movement of the link is thus materially slowed up during further application of the brakes with the result that the full force and effect of the power multiplication of the hand operated mechanism A is transmitted to the chain 18 and the brake mechanism proper of the car until the brakes have been fully set. This condition is reached soon after the link D leaves contact with the hub 22 of the member C as the parts are moved toward the position shown in Figure 5. Under normal conditions, this last mentioned movement will be rather limited compared to the quick take-up movement as my improved take-up mechanism serves to take up substantially all of the slack during swinging movement of the link D about the pivotal axis of the member C. However, if under exceptionally unusual conditions, additional movement of the chain 18 is required to fully set the brakes, due to the existence of excessive slack in the mechanism, the member C may be rocked considerably beyond the amount required to fully set the brakes under normal conditions, the limit of permissible movement of the parts not being reached until they are moved some distance beyond the position indicated in Figure 5. In this connection, it is further pointed out that the amount of movement shown in Figure 5 is far in excess of that required to meet the most abnormal and unusual conditions which are actually encountered in railway practice.

When the brakes are released by the chain 17 being unwound from the winding mechanism of the hand brakes A, the member C due to the pull of the chain 18 swings in a clockwise direction, as viewed in Figure 5, from the approximate position shown in this figure through the position shown in Figure 4 to the position shown in Figure 3.

I have herein shown and described what I now consider the preferred manner of carrying out my invention, but the same is merely illustrative and I contemplate all changes and modifications that come within the scope of the claims appended hereto.

I claim:

1. In a quick take-up mechanism for hand brakes for cars, the combination with a swinging member provided with a hub portion by which it is pivotally supported, said member presenting a winding surface remote from said hub; of a link pivoted at its lower end to said member at the inner end of the winding surface; a chain anchored to said member at said connection between the arm and link and windable on said surface, said chain being connected to the brake mechanism proper of the car; and a pull-up member actuated by the hand operated mechanism of the brakes and connected to the upper end of said link, said link being of a length to engage said hub to limit movement of the link toward the pivotal axis of said hub.

2. In a quick take-up mechanism for hand brakes, the combination with a rocking member having a chain winding surface remote from the pivot thereof; of a link adapted to be pulled upwardly by the hand operated means of the brake; a chain leading to the brake mechanism proper of the car; and a pivot pin extending through said member, the lower end of said rod, and the end link of said chain, thereby connecting the lower end of the link to said member and chain.

3. In a hand brake mechanism for railway cars, the combination with a hand actuated pull-up means; of a rocker pivoted on said car, said rocker having a stop shoulder thereon and a winding surface remote from the pivot of said rocker; a link connecting said pull-up member to the rocker, said link being pivotally connected to said rocker and having its pivotal movement limited by said stop shoulder; and a flexible element connected to said rocker at the point of pivotal connection of the link and rocker, said flexible element connecting the rocker to the brake means proper of the car.

4. In a hand brake mechanism for railway cars, the combination with a hand actuated pull-up mechanism at the end of the car; of a take-up lever member having a hub portion by which it is pivotally supported from the bottom of the car; a flexible element leading to the brake mechanism proper of the car; a pull-up link pivotally connected to and actuated by the hand operated brake means of the car; and an anchoring member connecting the flexible element and the lower end of the link to the outer end of said lever member, said link being of a length to engage with the hub of said lever member.

5. In a quick take-up mechanism for hand brakes, the combination with a link having a forked lower end portion; of a flexible motion transmitting member for actuating the brake mechanism proper of the car; a pivot member connecting the flexible member and said forked lower end of the link; a pull-up element pivotally connected to the upper end of said link, said pull-up element being actuated by the hand operated actuating means of the brake mechanism; and a winding element for said flexible means, said winding element having a hub portion, a pivot member extending through said hub portion for swingingly supporting said winding element, said winding element having a portion thereof engaged in the fork of said link, said winding element being pivotally connected to said flexible member and link by the pivot pin connecting said forked end of the link and flexible element, said last named pivotal connection being remote from the pivotal axis of said hub portion, and the distance between the pivots at opposite ends of said link being greater than the distance between the pivotal axis of said hub and the pivot at the lower end of said link.

6. In means for transmitting motion from the hand operated means of a railway car brake to the brake mechanism proper of the car, the combination with a rocking member operatively connected to said brake mechanism proper; of a link pivotally connected at its lower end to said rocking member and actuated by said hand operated means; stop means on said rocker for limiting swinging movement of said link toward the axis of rotation of said rocking member; and flexible means connecting the pivot at said lower end of the link to the brake mechanism proper of the car.

HARVEY J. LOUNSBURY.